United States Patent
Rui et al.

(10) Patent No.: US 7,349,005 B2
(45) Date of Patent: *Mar. 25, 2008

(54) AUTOMATED VIDEO PRODUCTION SYSTEM AND METHOD USING EXPERT VIDEO PRODUCTION RULES FOR ONLINE PUBLISHING OF LECTURES

(75) Inventors: Yong Rui, Sammamish, WA (US); Anoop Gupta, Woodinville, WA (US); Qiong Liu, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 1185 days.

This patent is subject to a terminal disclaimer.

(21) Appl. No.: 09/681,835

(22) Filed: Jun. 14, 2001

(65) Prior Publication Data

US 2002/0196327 A1 Dec. 26, 2002

(51) Int. Cl.
*H04N 7/14* (2006.01)
(52) U.S. Cl. .................................. 348/14.11
(58) Field of Classification Search .. 348/14.01–14.09, 348/14.1, 14.11, 14.12, 14.13, 14.16, 36–39, 348/143, 169–172, 211.99, 211.3, 14.7, 159, 348/105; 382/293
See application file for complete search history.

(56) References Cited

U.S. PATENT DOCUMENTS

| | | | | |
|---|---|---|---|---|
| 5,382,972 A | * | 1/1995 | Kannes | 348/15 |
| 5,434,617 A | * | 7/1995 | Bianchi | 348/170 |
| 5,539,483 A | | 7/1996 | Nalwa | |
| 5,745,305 A | | 4/1998 | Nalwa | |
| 5,793,527 A | | 8/1998 | Nalwa | |
| 5,877,801 A | * | 3/1999 | Martin et al. | 348/36 |
| 5,959,717 A | * | 9/1999 | Chaum | 352/40 |
| 5,990,934 A | | 11/1999 | Nalwa | |
| 6,005,611 A | | 12/1999 | Gullichsen et al. | |
| 6,043,837 A | | 3/2000 | Driscoll, Jr. et al. | |
| 6,072,522 A | * | 6/2000 | Ippolito et al. | 348/15 |
| 6,111,702 A | | 8/2000 | Nalwa | |
| 6,115,176 A | | 9/2000 | Nalwa | |
| 6,128,143 A | | 10/2000 | Nalwa | |

(Continued)

OTHER PUBLICATIONS

Bargeron, D., A. Gupta, J. Grudin and E. Sanocki. Annotations for Streaming Video on the Web: System Design and Usage Studies. Microsoft Research, Redmond, WA, USA.

(Continued)

*Primary Examiner*—Tung Vo
*Assistant Examiner*—Behrooz Senfi
(74) *Attorney, Agent, or Firm*—Lyon & Harr, L.L.P.; Craig S. Fischer

(57) ABSTRACT

An automated system and method for producing videos using expert video production rules. The automated video production system and method of the present invention is particularly well-suited for the online publishing of lectures. The system of the present invention includes a camera system for capturing the lecture, such as an audience-tracking camera and a non-intrusive lecturer-tracking camera. Moreover, each camera may be controlled by a cinematographer. Tracking of a subject is performed using a history-based, reduced-motion tracker that sets up a camera shot based on the subject's movement history and leaves the shot fixed until the camera is switched. The system also includes a virtual director module having a probabilistic finite state machine (FSM) module that uses probabilistic rules and the expert video production rules to determine a current camera view.

29 Claims, 7 Drawing Sheets

U.S. PATENT DOCUMENTS

| | | | |
|---|---|---|---|
| 6,141,145 | A | 10/2000 | Nalwa |
| 6,144,501 | A | 11/2000 | Nalwa |
| 6,175,454 | B1 | 1/2001 | Hoogland et al. |
| 6,195,204 | B1 | 2/2001 | Nalwa |
| 6,219,089 | B1 | 4/2001 | Driscoll, Jr. et al. |
| 6,219,090 | B1 | 4/2001 | Nalwa |
| 6,222,683 | B1 | 4/2001 | Hoogland et al. |
| 6,275,258 | B1* | 8/2001 | Chim .................... 348/211.12 |
| 6,285,365 | B1 | 9/2001 | Nalwa |
| 6,313,865 | B1 | 11/2001 | Driscoll, Jr. et al. |
| 6,331,869 | B1 | 12/2001 | Furlan et al. |
| 6,337,708 | B1 | 1/2002 | Furlan et al. |
| 6,341,044 | B1 | 1/2002 | Driscoll, Jr. et al. |
| 6,346,967 | B1 | 2/2002 | Gullichsen et al. |
| 6,356,296 | B1 | 3/2002 | Driscoll, Jr. et al. |
| 6,356,397 | B1 | 3/2002 | Nalwa |
| 6,369,818 | B1 | 4/2002 | Hoffman et al. |
| 6,373,642 | B1 | 4/2002 | Wallerstein et al. |
| 6,388,820 | B1 | 5/2002 | Wallerstein et al. |
| 6,392,687 | B1 | 5/2002 | Driscoll, Jr. et al. |
| 6,424,377 | B1 | 7/2002 | Driscoll, Jr. et al. |
| 6,426,774 | B1 | 7/2002 | Driscoll, Jr. et al. |
| 6,459,451 | B2 | 10/2002 | Driscoll, Jr. et al. |
| 6,466,254 | B1 | 10/2002 | Furlan et al. |
| 6,480,229 | B1 | 11/2002 | Driscoll, Jr. et al. |
| 6,493,032 | B1 | 12/2002 | Wallerstein et al. |
| 6,515,696 | B1 | 2/2003 | Smith |
| 6,539,547 | B2 | 3/2003 | Driscoll, Jr. et al. |
| 6,583,815 | B1 | 6/2003 | Driscoll, Jr. et al. |
| 6,593,969 | B1 | 7/2003 | Driscoll, Jr. et al. |
| 6,597,520 | B2 | 7/2003 | Wallerstein et al. |
| 6,700,711 | B2 | 3/2004 | Nalwa |
| 6,741,250 | B1 | 5/2004 | Furlan et al. |
| 6,756,990 | B2 | 6/2004 | Koller |
| 6,847,391 | B1* | 1/2005 | Kassatly .................. 348/14.01 |
| 6,885,509 | B2 | 4/2005 | Wallerstein et al. |
| 6,924,832 | B1 | 8/2005 | Shiffer et al. |
| 6,937,266 | B2* | 8/2005 | Rui et al. ................ 348/14.05 |
| 2002/0031756 | A1* | 3/2002 | Holtz et al. ................. 434/362 |
| 2002/0034020 | A1 | 3/2002 | Wallerstien et al. |
| 2002/0057340 | A1* | 5/2002 | Fernandez et al. .......... 348/143 |
| 2002/0063802 | A1 | 5/2002 | Gullichsen et al. |
| 2002/0094132 | A1 | 7/2002 | Hoffman et al. |
| 2002/0101505 | A1* | 8/2002 | Gutta et al. .............. 348/14.07 |
| 2002/0154417 | A1 | 10/2002 | Wallerstein et al. |
| 2003/0142402 | A1 | 7/2003 | Carb, Jr. et al. |
| 2003/0154476 | A1* | 8/2003 | Abbott et al. .................. 725/37 |
| 2003/0193606 | A1 | 10/2003 | Driscoll, Jr. et al. |
| 2003/0193607 | A1 | 10/2003 | Driscoll, Jr. et al. |
| 2004/0008407 | A1 | 1/2004 | Wallerstein et al. |
| 2004/0008423 | A1 | 1/2004 | Driscoll, Jr. et al. |
| 2004/0021764 | A1 | 2/2004 | Driscoll, Jr. et al. |
| 2004/0252384 | A1 | 12/2004 | Wallerstien et al. |
| 2004/0254982 | A1 | 12/2004 | Hoffman et al. |

OTHER PUBLICATIONS

Baumberg, A.M. and D.C. Hogg. An Efficient Method for Contour Tracking using Active Shape Models. University of Leeds School of Computer Studies Research Report Series: Report 94.11. Apr. 1994.

Benesty, J. Adaptive eigenvalue decomposition algorithm for passive acoustic source localization. J. Acoust. Soc. Am. 107 (1), Jan. 2000.

Bianchi, M.H. AutoAuditorium: a Fully Automatic, Multi-Camera System to Televise Auditorium Presentations. AutoAuditorium System: Smart Spaces Conference Paper. Bellcore Applied Research, Morristown, NJ.

Brandstein, M. S. A Pitch-Based Approach to Time-Delay Estimation of Reverberant Speech. Division of Engineering and Applied Sciences Harvard University Cambridge, MA.

Brotherton, J.A. and G.D. Abowd. Rooms Take Note: Room Takes Notes! AAA1 Proceedings Template. Graphics, Visualization, and Usability Center. College of Computing, Georgia Institute of Technology. Atlanta, GA.

Buxton, W., A. Sellen and M. Sheasby. (1997). Interfaces for multiparty videoconferencing. In K. Finn, A. Sellen & S. Wilber (Eds). Video Mediated communication. Hillsdale, N.J.: Erlbaum, 385-400.

Cruz, G. and R. Hill. Capturing and Playing Multimedia Events with STREAMS. Bellcore, Morristown, NJ.

Cutler, R. and M. Turk, "View-based interpretation of real-time optical flow for gesture recognition", IEEE International Conference on Automatic Face and Gesture Recognition, Apr. 1998.

Foote, J. and D. Kimber. FlyCam: Practical Panoramic Video and Automatic Camera Control. FX Palo Alto Laboratory, Inc. Palo Alto, CA.

Gleicher, M. and J. Masanz. Towards Virtual Videography. ACM 2000.

He, L.-W., M.F. Cohen, and D.H. Salesin. The Virtual Cinematographer: A Paradigm for automatic Real-Time Camera control and Directing. Microsoft Research, Seattle, WA. Department of Computer science and Engineering, University of Washington.

He. L., J. Grudin, A. Gupta. Designing Presentations for On-Demand Viewing. Technical Report: MSR-TR-99-69. Sep. 1999. Microsoft Research, Redmond, WA.

Jancke, G., J. Grudin, A. Gupta. Presenting to Local and Remote Audiences: Design and Use of the TELEP System. vol. 1: issue 1. CHI 2000, Apr. 2000.

Jiang, W. and H. Malvar. Adaptive Noise Reduction of Speech Signals. Technical Report: MSR-TR-200-86. Microsoft Research, Redmond, WA.

Liu, Q., Y. Rui, A. Gupta and J.J. Cadiz. Automating Camera Management for Lecture Room Environments. CHI 2001, vol. No. 3, Issue 1.

Mukhopadhyay, S. and B. Smith. Passive Capture and structuring of Lectures. Department of Computer Science, Cornell University. Ithaca, NY.

Omoigui, N., L. He, A. Gupta, J. Grudin, and E. Sanocki. Time-Compression: Systems Concerns, Usage, and Benefits. CHI '99 Pittsburgh, PA USA.

Stiefelhagen, R., J. Yang, and A. Waibel. Modeling Focus of Attention for Meeting Indexing. ACM Multimedia '99. Orlando, FL, USA.

Wang, C. and M.S. Brandstein. A Hybrid Real-Time Face Tracking System. Submitted to ICASSP98, Nov. 1997.

Wang, H. and P. Chu. Voice source localization for automatic camera pointing system in video conferencing, ICASSP'97.

Zhai, S., C. Morimoto, and S. Ihde. Manual and Gaze Input Cascaded (MAGIC) Pointing. In Proc. CHI '99: ACM Conference on Human Factors in Computing Systems. 246-153, Pittsburgh, May 15-20, 1999.

Zhang, Z. A Flexible New Technique for Camera Calibration. Technical Report: MSR-TR-98-71. Microsoft Research. Redmond, WA.

* cited by examiner

AUTOMATED VIDEO PRODUCTION SYSTEM AND METHOD USING EXPERT VIDEO PRODUCTION RULES FOR ONLINE PUBLISHING OF LECTURES

BACKGROUND OF INVENTION

1. Field of the Invention

The present invention relates in general to automated video production and more particularly to an automated system and method for producing videos using expert video production rules.

2. Related Art

A lecture (such as, for example, a meeting, a talk, a seminar, a presentation and classroom instruction) is an important tool whereby knowledge transfer, teaching and learning can occur. A lecture, which can be any setting whereby an exchange of information occurs, may include at least one lecturer and an audience. Universities and many corporations, inspired by both the increased emphasis on life-long learning and the rapid pace of technological change, are offering an ever-increasing selection of lectures to teach, train and inform students and employees. In order to accommodate all persons interested in a lecture and to manage the inevitable time conflicts that occur, many of these lectures are made accessible "online" over a computer network. Viewing a lecture online allows a person to remotely view the lecture either while the actual lecture is occurring ("live") or at a later time ("on-demand").

In order to facilitate viewing of a lecture both live and on-demand, the lecture must be made available (or published) online. Online publishing of a lecture enables a person to view the lecture at a time and location that is convenient for the person. Online publishing of lectures is becoming more feasible and popular due to continuous improvements in computer network infrastructure and streaming-media technologies. The popularity of publishing lecture online is gaining momentum slowly, however, and the fact remains that the majority of lectures that take place are not recorded or made available online. Two key barriers to online publishing are the cost of equipping lecture rooms with the equipment (such as cameras) needed to capture the lecture and the labor costs associated with having people produce the lecture video. Equipment cost is a one-time cost and tends to become less expensive as market demand increases. Labor cost for video production, however, is a recurring cost and one is of the main prohibitions to the online publishing of lectures.

As computer technology continues to advance, one alternative to hiring a human video production team is to construct a fully automated video production system that replaces human operators with machines. Automated video production systems and methods that are able to provide high-quality recordings are highly desirable because labor costs associated with video production are greatly reduced. Because labor costs are a major obstacle to recording lectures, reducing these labor costs by using high-quality automated video production techniques instead of a human video production team reduces at least some obstacles to online publishing of lectures.

There are a few existing automated video production systems and research prototypes. However, each of these systems has one of more of the following limitations:

Single camera setup: One disadvantage with a single camera setup is that there are long switching times between camera views. In other words, when switching between camera views, the single camera must be repositioned and this repositioning takes time. This causes a delay in the transition from a current camera view to a new camera view. Another disadvantage is that there is no backup camera in case the tracking device of the single camera fails, which can happen in a fully automated system.

Using invasive sensors to track lecturers: These sensors must be worn by the lecturer and may be bothersome to the lecturer and interfere with the lecturer's freedom of movement.

Simplistic directing rules: One disadvantage of having simplistic directing rules is that they do not automatically produce lecture videos that are of the same high quality as lecture videos produced by a professional human video production team. For example, many existing systems use directing rules that state camera views should be switched when a triggering event of a transition from one slide to another occurs.

Lack of an audience-tracking camera: Human video production teams know and studies have shown that the audience is an important and useful part of the lecture experience and include camera views of the audience when capturing the lecture. An audience camera can focus on an audience member who asks questions and can provide random audience shots to make the lecture more enjoyable for a viewer to watch. Leaving out camera views of the audience and those audience members who may ask questions by not providing an audience-tracking camera severely degrades the quality of the final lecture video.

Accordingly, there exists a need for an automated video production technique that is automated to alleviate human labor costs associated with producing a lecture video. What is needed is an automated video production technique that captures lectures in a professional and high-quality manner using the similar rules used by professional human directors and cinematographers. What is further needed is an automated video production system that includes multiple cameras to enable fast switching of camera views, to allow a variety of camera views and to provide backup cameras in the case of camera failure. Moreover, what is needed is an automated video production technique that uses an audience-tracking camera to provide audience camera views and to make the lecture video more enjoyable for a viewer to watch. Moreover, what is needed is an automated video production system and method that tracks a lecturer in a lecture without the need for the lecturer to wear bothersome and restricting sensors, such that the lecturer remains unaware of the tracking. This type of automated video production technique takes into account the desires of the viewing audience and caters to these desires to make the production and viewing of lectures online an enjoyable experience while at the same time enhancing the learning process.

SUMMARY OF INVENTION

To overcome the limitations in the prior art as described above and other limitations that will become apparent upon reading and understanding the present specification, the present invention includes an automated video production system and method that uses expert video production rules. The video production rules are obtained by determining the rules used by human experts in the video production field (such as professional human video producers) and implementing the rules that are achievable given the available technology and at a reasonable cost. These video production rules may include, for example, rules on how the cameras should be positioned, rules on how a lecturer should be framed, and rules on how multiple camera views should be edited to generate a current camera view (or output camera view) seen by a user.

In general, the automated video production system of the present invention includes a camera system having at least one camera for capturing the lecture and a cinematographer for controlling the camera. The camera system preferably includes a plurality of cameras that provide multiple camera views. Alternatively, however, the system may include a single high-resolution panoramic camera having a wide angle field-of-view (such as an approximately 360-degree field-of-view). When this type of single camera is used, camera views are constructed by focusing on a portion of the entire field of view. For example, if a lecturer is being tracked then only the portion of the 360-degree image that includes the lecturer is displayed for a camera view. Alternatively, the system may include a plurality of cameras arranged such that an approximately 360-degree field of view is provided. The cinematographer provides control over one or more of the cameras in the system. Preferably, the cinematographer is a virtual cinematographer that is a software module incorporating at least some of the video production rules described below. Alternatively, the cinematographer may be an analog component or even a human being that is controlling the camera.

The camera system preferably includes one or more audience-tracking cameras for providing audience images and tracking audience members. In addition, the camera system may include one or more lecturer-tracking cameras that non-invasively track a lecturer without the need for the lecturer to wear a sensor. The camera system may also lack a lecturer-tracking camera. The camera system may also include none, one or more overview cameras that provide an overview camera view of the lecture environment. Camera views are framed using the expert video production rules. For instance, the audience-tracking camera is used to show a camera view of the audience even if no one in the audience is talking, in order to follow an expert video production rule that the audience should be shown occasionally even if there is no question. Tracking of a subject is performed using a history-based, reduced-motion tracker. This tracker tracks a subject and sets a camera shot (zoom and pan) using the subject's movement history. Once the camera view is determined and set, it is fixed to reduce any distracting and unnecessary camera movements.

The automated video production system also includes a virtual director module for selecting and determining which of the multiple camera views are a current camera view to be viewed by a user. Each of the cinematographers reports a camera status to the virtual director module. The virtual director module has two components: an event generator that generates a triggering event which initiates switching (or changing) from one camera view to another, and a finite state machine (FSM) to decide to which camera view to switch. Based on each reported status, the virtual director uses probabilistic rules and the expert video production rules to determine the current camera view. The virtual director determines the current camera view by deciding how long a camera should be used, when the current camera view should be changed and which camera view should be the new current camera view. Unlike other types of automated video production techniques that merely use a simplistic fixed rotation to select the current camera view, the present invention uses a probabilistic transition matrix constricted by expert video production rules to select the current camera view. Thus, the camera selected as the next current camera view is a weighted random choice. This enables the automated video production system and method of the present invention to produce a more aesthetically pleasing and professional video production without the expense of human video production team.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF DRAWINGS

The present invention can be further understood by reference to the following description and attached drawings that illustrate preferred embodiments of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. General Overview

The present invention includes an automated video production system and method useful for producing videos of lectures for live broadcasting or on-demand viewing. The present invention is modeled after a professional human video production team. The system of the present invention includes a camera system having one or more cameras for capturing a lecture, virtual director, and may include one or more virtual cinematographers. A virtual cinematographer can be assigned to a camera of the camera system and is used to control the camera in capturing the lecture by determining which camera view to obtain and how to track a subject (such as a lecturer). The virtual director receives data from the virtual cinematographer and determines which of the multiple camera views obtained by the camera system is the current (or output) camera view seen by a user. The edited lecture video is then encoded for both live broadcasting and on-demand viewing. Both the virtual cinematographer and the virtual director are controlled in accordance with expert video production rules. As explained in detail below, these rules provide a framework whereby the virtual cinematographer and the virtual director can emulate a professional human video production team.

Figure 1:
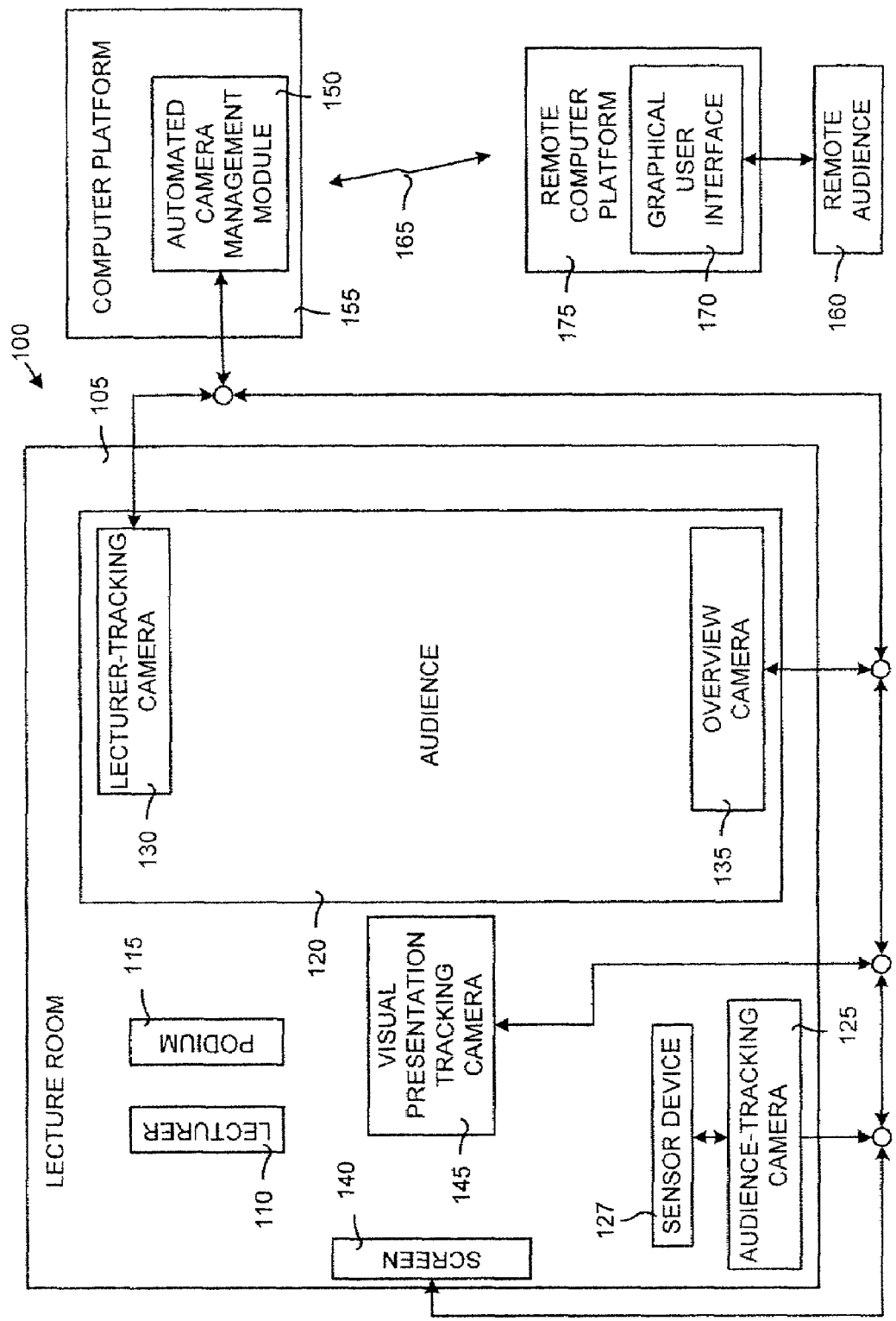
FIG. 1 is an overall block diagram illustrating an implementation of the automated video production system of the present invention for capturing a lecture and is provided for illustrative purposes only.

FIG. 1 is an overall block diagram illustrating an implementation of the automated video production system 100 of the present invention for capturing a lecture and is provided for illustrative purposes only. It should be noted that the automated video production system 100 shown in FIG. 1 is only one example of numerous ways in which the present invention may be implemented. In general, the automated video production system 100 records the lecture, edits the lecture while recording and transmits the edited lecture video to a remote location. More specifically, a lecture is presented in a lecture room 105 by a lecturer 110. The lecturer 110 typically uses a podium 115 within the lecture room 105 for holding aids such as notes and a microphone (not shown). The lecture room 105 also includes an area for an audience 120 to view the lecture.

In the implementation shown in FIG. 1, the capture of the lecture is achieved using a plurality of cameras and a plurality of cinematographers that are used to control some of the cameras. The plurality of cameras are positioned around the lecture room 105 such that views from each of the cameras differ significantly from each other. As discussed in detail below, this is to follow an expert video production rule that when transitioning from one camera shot to another the view should be significantly different. As shown in FIG. 1, the automated video production system 100 includes an audience-tracking camera 125 that is positioned in the lecture room 105 to provide a camera view of members of the audience 120. Moreover, as explained in detail below, the audience-tracking camera 125 uses a sensor device 127 (such as a microphone array) to track specific members of the audience 120, such as those audience members asking questions. A lecturer-tracking camera 130 is included in the automated video production system 100 and positioned in the lecture room 105 to provide camera views of the lecturer 110. As explained in detail below, the lecturer-tracking camera 130 of the present invention does not require that the lecturer 110 wear any tracking equipment (such as an infrared (IR) emitter or magnetic emitter) so that the lecturer 110 is not bothered by the need to wear the extra tracking equipment.

The present invention also includes an overview camera 135 that allows the automated video production system 100 to follow the expert video production rule that the lecture environment should be established first. The overview camera 135 is also used as a backup camera, so that if one of the tracking cameras fails the camera view from the overview camera may be substituted. In this implementation, the overview camera 135 is static, although other implementation may dictate that the overview camera be able to move.

Moreover, the overview camera also may include a plurality of cameras, both static and dynamic. The automated video production system and method of the present invention starts with an overhead camera shot to establish the lecture environment. As part of the lecture the lecturer 110 may use sensory aids to augment the lecture. For example, as shown in FIG. 1 the lecturer 110 may use slides projected onto a screen 140. These slides are captured using a visual presentation tracking camera 145 that is capable of providing camera views of the visual presentations used in the lecture, which in this case are slides.

The automated video production system 100 includes an automated camera management module 150 that includes virtual cinematographers, a virtual director, a mixer and an encoder (all discussed in detail below) for controlling the capture of the lecture, editing the lecture and providing a final output of the recorded lecture. As shown in FIG. 1, in this implementation the automated video production system 100 resides on a single computer platform 155, assuming the computing power of the single computer platform 155 is enough. However, it should be noted that other implementations are possible, such as having each virtual cinematographer and virtual director reside on separate computer platforms. Moreover, even though FIG. 1 illustrates various virtual cinematographers and the virtual director as separate modules, these modules may actually be resident on a single computer running different threads. In this implementation, the screen 140, visual presentation tracking camera 145, audience-tracking camera 125, lecturer-tracking camera 130 and overview camera 135 are connected to the automated camera management module 150 to facilitate production control. The finished lecture video is presented to a remote audience 160 by transmission over a communication channel 165 (such as network). The remote audience 160 interfaces with the lecture video using a graphical user interface 170 residing on a remote computer platform 175.

Figure 2:
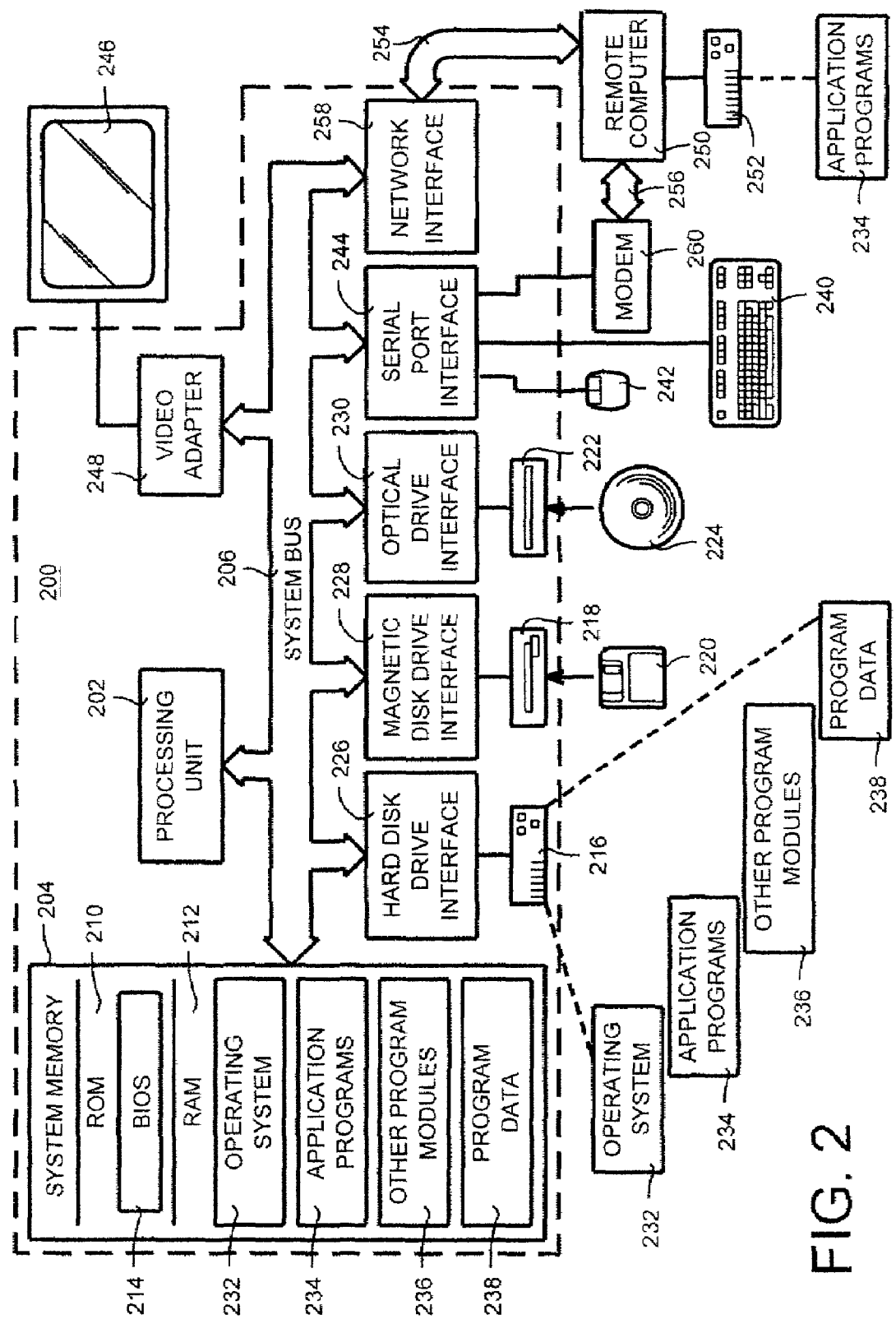
FIG. 2 is a general block diagram illustrating a computing platform as shown in FIG. 1 that preferably may be used to carry out the present invention.

In a preferred embodiment, the computer platform 155 and the remote computer platform 175 are computing machines (or devices) in a computing environment (such as a client/server networking environment). FIG. 2 is a general block diagram illustrating a computing platform as shown in FIG. 1 that preferably may be used to carry out the present invention. FIG. 2 and the following discussion are intended to provide a brief, general description of a suitable computing environment in which the automated video production system and method of the present invention may be implemented. Although not required, the present invention will be described in the general context of computer-executable instructions (such as program modules) being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

Referring to FIG. 2, an exemplary system for implementing the present invention includes a general-purpose computing device in the form of a conventional personal computer 200, including a processing unit 202, a system memory 204, and a system bus 206 that couples various system components including the system memory 204 to the processing unit 202. The system bus 206 may be any of several types of bus structures including a memory bus or memory controller, a peripheral bus, and a local bus using any of a variety of bus architectures. The system memory includes read only memory (ROM) 210 and random access memory (RAM) 212. A basic input/output system (BIOS) 214, containing the basic routines that help to transfer information between elements within the personal computer 200, such as during start-up, is stored in ROM 210. The personal computer 200 further includes a hard disk drive 216 for reading from and writing to a hard disk (not shown), a magnetic disk drive 218 for reading from or writing to a removable magnetic disk 220, and an optical disk drive 222 for reading from or writing to a removable optical disk 224 (such as a CD-ROM or other optical media). The hard disk drive 216, magnetic disk drive 228 and optical disk drive 222 are connected to the system bus 206 by a hard disk drive interface 226, a magnetic disk drive interface 228 and an optical disk drive interface 230, respectively. The drives and their associated computer-readable media provide nonvolatile storage of computer readable instructions, data structures, program modules and other data for the personal computer 200.

Although the exemplary environment described herein employs a hard disk, a removable magnetic disk 220 and a removable optical disk 224, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 220, optical disk 224, ROM 210 or RAM 212, including an operating system 232, one or more application programs 234, other program modules 236 and program data 238. A user (not shown) may enter commands and information into the personal computer 200 through input devices such as a keyboard 240 and a pointing device 242. In addition, other input devices (not shown) may be connected to the personal computer 200 including, for example, a camera, a microphone, a joystick, a game pad, a satellite dish, a scanner, and the like. These other input devices are often connected to the processing unit 202 through a serial port interface 244 that is coupled to the system bus 206, but may be connected by other interfaces, such as a parallel port, a game port or a universal serial bus (USB). A monitor 246 or other type of display device is also connected to the system bus 206 via an interface, such as a video adapter 248. In addition to the monitor 246, personal computers typically include other peripheral output devices (not shown), such as speakers and printers.

The personal computer 200 may operate in a networked environment using logical connections to one or more remote computers, such as a remote computer 250. The remote computer 250 may be another personal computer, a server, a router, a network PC, a peer device or other common network node, and typically includes many or all of the elements described above relative to the personal computer 200, although only a memory storage device 252 has been illustrated in FIG. 2. The logical connections depicted in FIG. 2 include a local area network (LAN) 254 and a wide area network (WAN) 256. Such networking environments are commonplace in offices, enterprise-wide computer networks, intranets and the Internet.

When used in a LAN networking environment, the personal computer 200 is connected to the local network 254 through a network interface or adapter 258. When used in a WAN networking environment, the personal computer 200 typically includes a modem 260 or other means for establishing communications over the wide area network 256, such as the Internet. The modem 260, which may be internal or external, is connected to the system bus 206 via the serial port interface 244. In a networked environment, program modules depicted relative to the personal computer 200, or portions thereof, may be stored in the remote memory storage device 252, it will be appreciated that the network connections shown are exemplary and other means of establishing a communications link between the computers may be used.

II. Components of the Invention

The present invention includes an automated video production system and method for online publishing of lectures. In order to produce a high-quality lecture video, human operators need to perform many tasks including tracking a moving lecturer, locating a talking audience member, or showing presentation slides. It takes many years of training and experience for a human operator to efficiently perform these tasks. Consequently, high-quality videos are usually produced by a human video production team that includes a director and multiple cinematographers. Distributing the video production tasks to different crewmembers and creating final video products through collaboration make the video production process more efficient and smooth. This strategy is a good model reference for a computer-based automated video production system. Inspired by this idea, the automated video production system and method is organized according to the structure of a human video production team.

In general, the components of the present invention include a camera system containing at least one camera, a cinematographer and a virtual director. The camera system is used to capture the lecture and may include a single camera or a plurality of cameras. The cinematographer is connected to one or more cameras and is used to control the camera views of the camera. In addition, the cinematographer may be used to track a subject (such as a lecturer). The cinematographer may be digital (such as a software module), analog, or may even be a human operator. The virtual director is a software module that receives the multiple camera views from the camera system and determines which of these multiple camera views to use as a current camera view.

Figure 3:
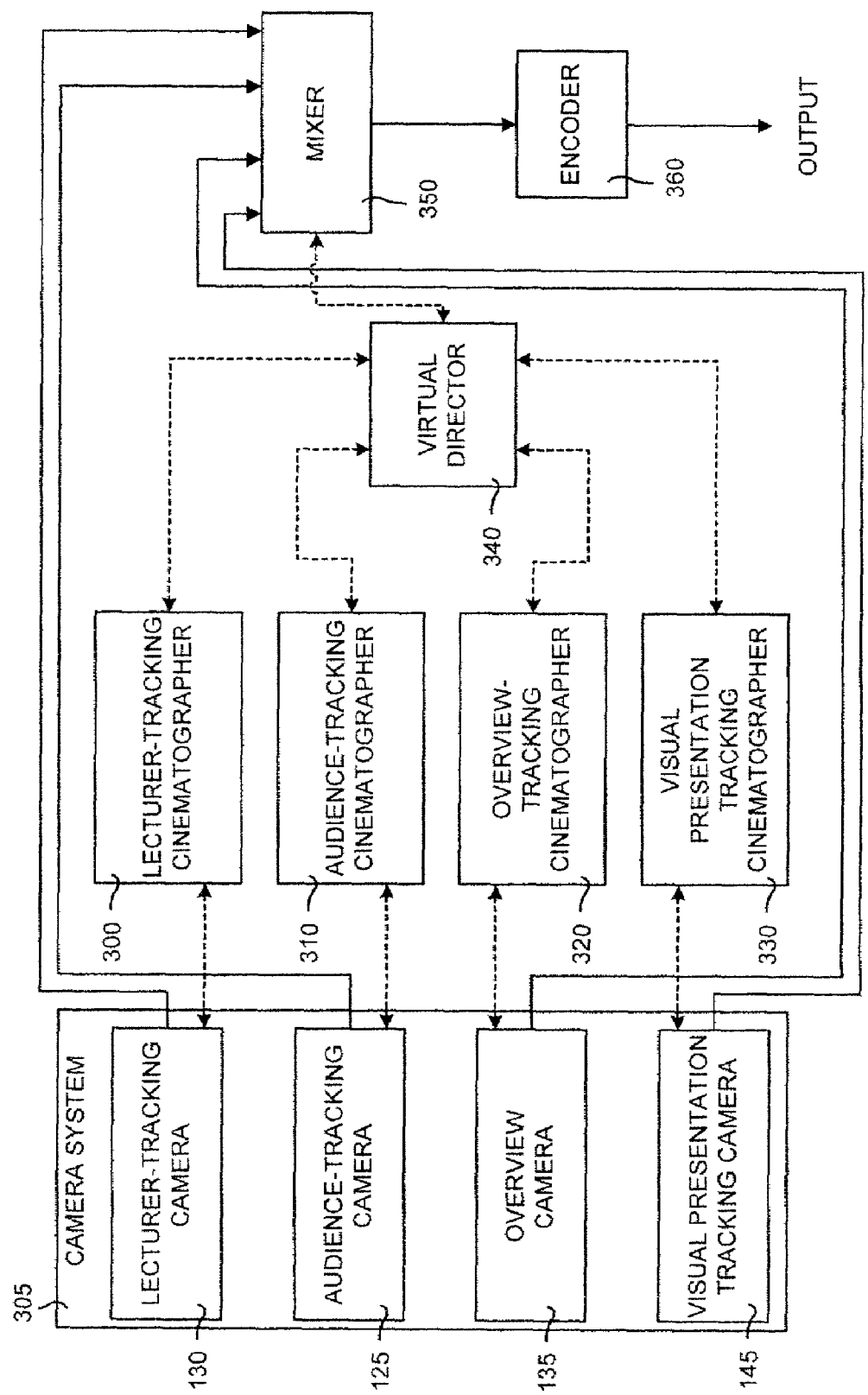
FIG. 3 is a general block/flow diagram illustrating the major components of the present invention and their interaction.

FIG. 3 is a general block/flow diagram illustrating the major components of the present invention and their interaction. The solid lines indicate video data and the dashed lines indicate control signals and status signals. It should be noted that the automated video production system of the present invention is a modular system and many of the components shown in FIG. 3 may be added to or subtracted from the system as desired. Typically, which components are included and the number of those components included in the system depend on the size and layout of the lecture room.

As shown in FIG. 3 camera system 305 may be used to capture a lecture. The camera system 305 may include a single camera (such as a panoramic camera providing an approximately 360-degree field-of-view) or a plurality of cameras. These plurality of cameras may include lecturer-tracking camera 130 for tracking a lecturer, an audience-tracking camera 125 for tracking audience members, an overview camera 135 for providing overview camera views of the lecture environment, and a visual presentation tracking camera 145 for tracking any visual presentation (such as video or slides) used during the lecture. A plurality of cinematographers also are available to control each of the cameras. These cinematographers include a lecturer-tracking cinematographer 300, an audience-tracking cinematographer 310, an overview-tracking cinematographer 320 and a visual presentation tracking cinematographer 330. A virtual director 340 is used to manage the video output of each camera. A mixer 350 is controlled by the virtual director 340 and mixes together the video inputs from each of the cameras as directed by the virtual director 340. The mixer 350 may be an analog mixer or may be a digital mixer that includes a software module that performs the mixing functions. An encoder 360 encodes the final product and sends as output a video of the lecture.

The system of the present invention is modeled after a human video production teams. This model includes using a two-level structure to simulate the roles performed by human cinematographers and directors. At the lower level, the virtual cinematographers of the present invention are assigned to different cameras to perform basic video shooting tasks, such as tracking a lecturer or locating a talking audience member. Each virtual cinematographer has the following four components: (1) sensors that sense the world, just like a human cinematographer has eyes and ears; (2) cameras that capture the scenes, just like human cinematographers have their video cameras; (3) framing rules that control the camera operation, just like human cinematographers have their knowledge of how to frame a camera view; and (4) virtual cinematographer/virtual director communication rules, just like human cinematographers need to communicate with their director. At the upper level, the virtual director of the present invention collects status and events information from each virtual cinematographer and controls the mixer to decide which of the multiple camera views from the camera system should be the current camera view seen by the user. The edited lecture video is then encoded for both live broadcasting and on-demand viewing.

Figure 4:
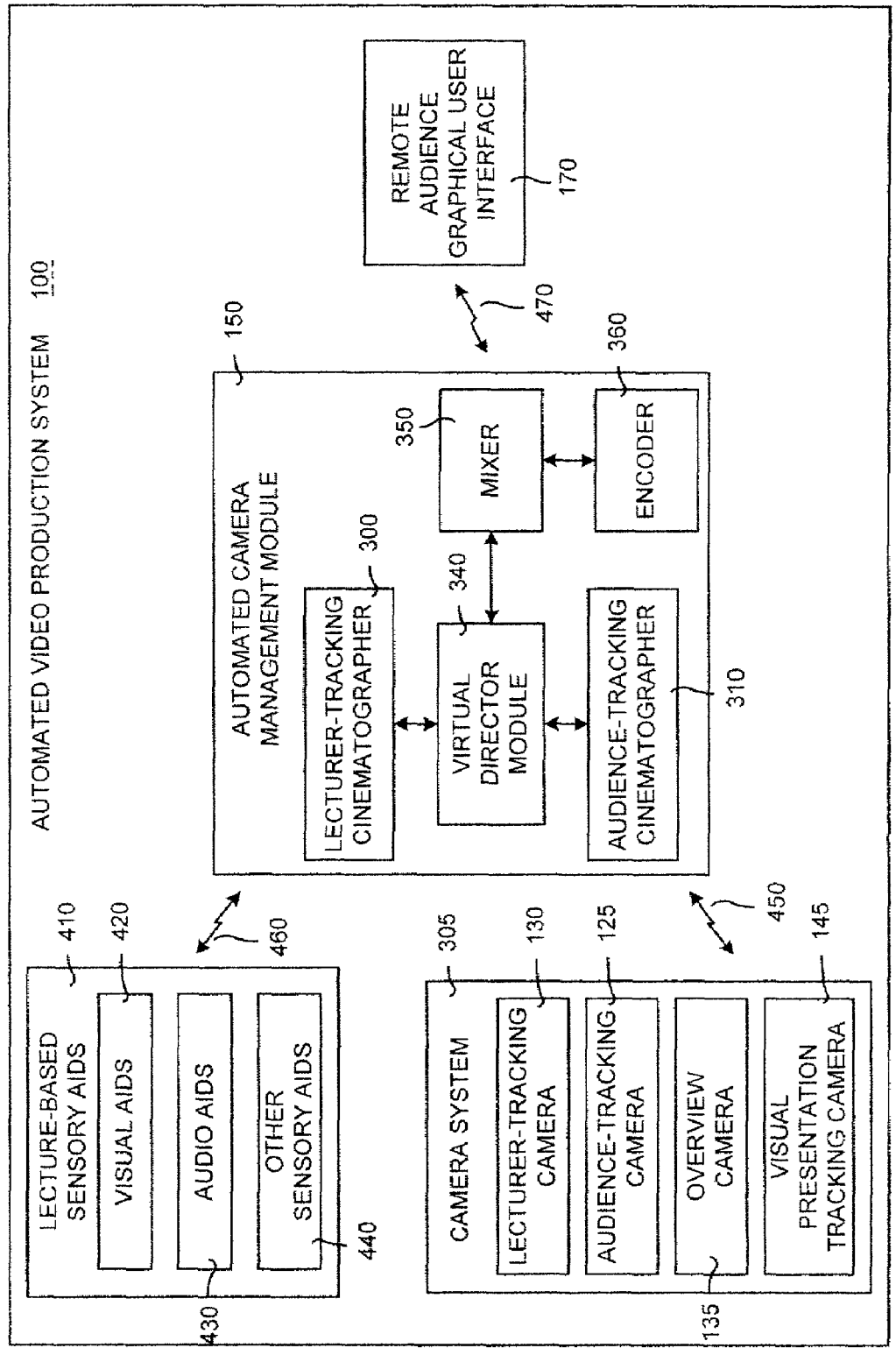
FIG. 4 is a general block diagram illustrating a preferred implementation of the major components of the present invention.

FIG. 4 is a general block diagram illustrating a preferred implementation of the major components of the present invention. The camera system 305 captures the lecture and provides multiple camera views of the lecture. The camera system 305 may include a variety of cameras. In particular, the camera system 305 may include the lecturer-tracking camera 130 for tracking a lecturer, the audience-tracking camera 125 for providing audience images and tracking desire audience members, the overview camera 135 for providing an overview of the lecture environment, and the visual presentation tracking camera 145 for tracking and providing camera views of visual presentations used the lecture.

In addition to using the camera system 305 to capture the lecture, the automated video production system 100 may also capture any lecture-based sensory aids 410 that are used during the lecture. These lecture-based sensory aids 410 include visual aids 420, audio aids 430 (such as audio recordings), and other sensory aids 440 (such as motion pictures). These lecture-based sensory aids 410 typically are used by a lecturer during a lecture to make the lecture more interesting and to emphasize a particular point. The camera system 305 and the lecture-based sensory aids 410 are in communication with the automated camera management module 150 through communication links 450, 460.

The automated camera management module 150 includes the lecturer-tracking cinematographer 300 in communication with the lecturer-tracking camera 130 that provides control of the lecturer-tracking camera 130. Further, the automated camera management module 150 includes the audience-tracking cinematographer 310 in communication with the audience-tracking camera 125 that controls the audience-tracking camera 125. Also included in the automated camera management module 150 is a virtual director 340 for receiving input from the lecturer-tracking cinematographer 300, the audience-tracking cinematographer 310, the overview camera 135 and the visual presentation tracking camera 145. One function of the virtual director 340 is to choose a current camera view that is viewed by a user from the multiple camera views provided by the camera system 305. In addition, the virtual director 145 receives input from the lecture-based sensory aids 410 (if they are being used) and determines how to incorporate them into the current camera view. For example, visual aids 410 such as slides may be incorporated into current camera view to produce a final video output. The virtual director 340 controls the mixer 350 by instructing the mixer 350 which of the multiple camera views from the camera system 305 to use as the current camera view.

In general, data from the camera system 305 and lecture-based sensory aids 410 are communicated to the mixer 350 and control signals from the virtual director 340 are communicated to the lecture-based sensory aids 410, the overview camera 135, the visual presentation tracking camera 145 and the mixer 350. In addition, control signals are communicated between the virtual director 340, the lecturer-tracking cinematographer 300 and the lecturer-tracking camera 130 as well as the audience-tracking cinematographer 310 and the audience-tracking camera 125. Once the virtual director 340 determines which of the multiple camera views from the camera system 305 to use as the current camera view. The selected camera view (along with any other data from the lecture-based sensory aids 410) is sent from the mixer 350 to the encoder 360 for encoding. The encoded lecture video is sent over a communication channel 470 for viewing by a remote audience. The remote audience views and interacts with the lecture video using a remote audience graphical user interface 170.

III. Component Details

The automated video production system of the present invention includes one or more virtual modules having a specific function. These virtual modules may be included or left out of the system depending on the desired result and the size and layout of the lecture room where the lecture occurs. These virtual modules include the lecturer-tracking virtual cinematographer, for tracking and filming the lecturer and the audience-tracking virtual cinematographer, for locating and filming audience members. The virtual modules also include the visual presentation tracking virtual cinematographer that films and tracks (if necessary) any visual presentations accompanying the lecture and the overview virtual cinematographer that films the podium area and servers as a backup in case the other virtual cinematographers are not ready or have failed. In addition, the virtual director selects the final video stream from the camera system 305. The lecturer-tracking virtual cinematographer, audience-tracking virtual cinematographer and the virtual director will now be discussed in detail.

Lecturer-Tracking Virtual Cinematographer

The lecturer is a key object in the lecture. Accurately tracking and correctly framing the lecturer therefore is of great importance. The lecturer-tracking virtual cinematographer follows the lecturer's movement and gestures for a variety of camera views: close-up to focus on expression, median shots for gestures, and long shots for context. In general, the lecturer-tracking virtual cinematographer includes four components: a camera, a sensor, framing rules and communication rules. A camera used in the lecturer-tracking virtual cinematographer is preferably a pan/tilt/pan cameras or active camera. The active camera is controlled by a device such as a computer.

Tracking a lecturer in a lecture room environment imposes both challenges and opportunities. The present invention includes three implementations or configurations that may be used in the present invention to track the lecturer. Each of these implementations may be used with one another or independently. Each of these implementations will now be discussed.

The first implementation for tracking a lecturer is also the simplest. This implementation uses a single active camera as both the sensor and the camera. Even though simple, there are two potential problems:

1. Because frame-to-frame differencing motion tracking is used to avoid extra motion compensation steps, it is necessary to stop the camera first before capturing the frames. The stop-and-move mode results in unpleasant video capturing;

2. Because tight shots of the lecturer are desired, the camera normally operates in the high zoom mode. The very narrow field-of-view (FOV) in the high zoom mode causes the camera to lose track of the lecturer quite easily.

A second implementation increases the active camera's FOV by using a wide-angle camera as the sensor and attaching the wide-angle camera directly to the active camera. When the two cameras are attached and optical axes aligned, the lecturer-tracking virtual cinematographer uses the wide-angle camera to locate the target and then uses the target location to control the active camera.

Because of its wide FOV, the wide-angle camera introduces a large radial distortion that is proportional to the distance from its frame center. Normally, this distortion must be corrected via camera intrinsic parameter estimation before the target location can be calculated. In this setup, however, because the two cameras move together, the target mostly will appear close to the center of the frame and it is not necessary to conduct the correction. In other words, this setup solves the problem of keeping the camera view tight on the lecturer but does not solve the problem of the camera moving around too much.

A third implementation addresses the first problem by having the wide-angle camera not move with the active camera. For this reason the wide-angle camera is mounted on a static base right above the active camera and the wide-angle camera's optical axis is aligned to that of the active camera's home position. This third implementation is preferred because both the first and second problems are solved by this implementation. However, this implementation does have a cost. Compared with the wide-angle camera attached to the active camera setup, this implementation requires an extra camera calibration step because of the wide-angle camera's distortion. In contrast to the wide-angle camera attached to the active camera setup, a lecturer can appear anywhere in the wide-angle camera frame, including the highly distorted regions of the wide-angle camera's boundaries. Techniques that unwarp the image are available and well known to those having ordinary skill in the art.

Audience-Tracking Virtual Cinematographer

Showing the audience members who are asking questions is important to make useful and interesting lecture videos. The present invention uses a sensing modality based on microphone arrays, where the audience-tracking virtual cinematographer first estimates the sound source direction using the microphones and then uses the estimation to control the active camera. This technique is called a sound source localization (SSL) technique.

In general, three types of SSL techniques exist in the literature: (a) steered-beamformer-based; (b) high-resolution spectral-estimation-based; and (c) time-delay-of-arrival (TDOA) based. The first two types of techniques are computationally expensive and not suitable for real-time applications. The preferred technique is the TDOA-based techniques, where the measure in question is not the acoustic data received by the sensors, but rather the time delays between each sensor.

Within various TDOA approaches the generalized cross-correlation (GCC) approach is one of the most successful. Mathematically, the GCC approach may be described as follows. Let s(n) be the source signal, and $x_1$ (n) and $x_2$ (n) be the signals received by the two microphones:

$$x_1(n) = as(n-D) + h_1(n)*s(n) + n_1(n)$$

$$x_2(n) = bs(n) + h_2(n)*s(n) + n_2(n) \quad (1)$$

where D is the TDOA, a and b are signal attenuations, $n_1$ (n) and $n_2$ (n) are the additive noise, and $h_1$ (n) and $h_2$ (n) represent the reverberations. Assuming the signal and noise are uncorrelated, D can be estimated by finding the maximum GCC between $x_1$ (n) and $x_2$ (n):

$$D = \operatorname*{argmax}_{\tau} \hat{R}_{x_1 x_2}(\tau) \quad (2)$$

$$\hat{R}_{x_1 x_2}(\tau) = \frac{1}{2\pi} \int_{-\pi}^{\pi} W(\omega) G_{x_1 x_2}(\omega) e^{j\omega t} d\omega$$

where $\hat{R}_{x_1 x_2}(\tau)$ is the cross-correlation of $x_1$ (n) and $x_2$ (n), $G_{x_1 x_2}(\omega)$ is the Fourier transform of $\hat{R}_{x_1 x_2}(\tau)$, i.e., the cross power spectrum, and W(w) is the weighting function.

In practice, choosing the right weighting function is of great significance for achieving accurate and robust time delay estimation. As can be seen from equation (1), there are two types of noise in the system, i.e., the background noise $n_1$ (n) and $n_2$ (n) and reverberations $h_1$ (n) and $h_2$ (n). Previous research suggests that the maximum likelihood (ML) weighting function is robust to background noise and phase transformation (PHAT) weighting function is better dealing with reverberations:

$$W_{ML}(\omega) = \frac{1}{|N(\omega)|^2}$$

$$W_{PHAT}(\omega) = \frac{1}{|G_{x_1 x_2}(\omega)|}$$

where $|N(w)|^2$ is the noise power spectrum.

It is easy to see that the above two weighting functions are at two extremes. In other words, $W_{ML}$ (w) puts too much emphasis on "noiseless" frequencies, while $W_{PHAT}$ (w) completely treats all the frequencies equally. To simultaneously deal with background noise and reverberations, a technique for use in the present invention has been developed as follows. Initially, $W_{ML}(w)$, which is the optimum solution in non-reverberation conditions is used. To incorporate reverberations, a generalized noise is defined as follows:

$$N'(\omega)|^2 = |H(\omega)|^2|S(\omega)|^2 + |N(\omega)|^2$$

Assuming the reverberation energy is proportional to the signal energy, the following weighting functions are obtained:

$$W(\omega) = \frac{1}{\gamma|G_{x_1 x_2}(\omega)| + (1-\gamma)|N(\omega)|^2}$$

where $\gamma \in [0, 1]$ is the proportion factor.

Figure 5:
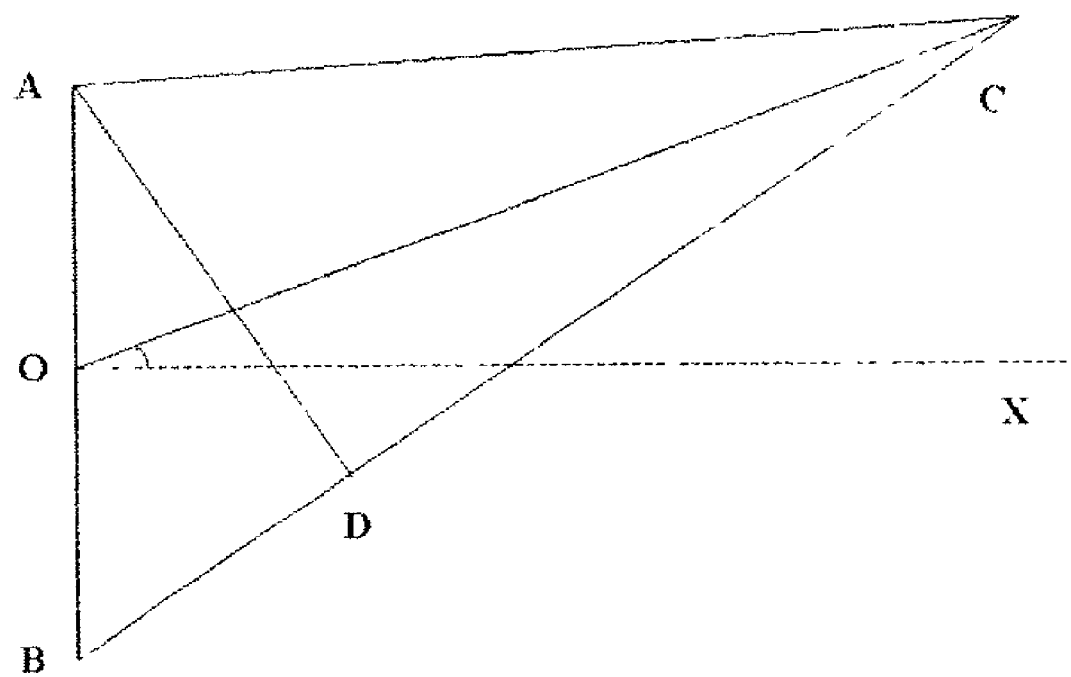
FIG. 5 is a geometric diagram illustrating the sound source localization technique of the present invention.

Once the time delay D is estimated from the above procedure, the sound source direction can be estimated given the microphone array's geometry. FIG. 5 is a geometric diagram illustrating the sound source localization technique of the present invention. As shown in FIG. 5, the two microphones are at locations A and B, where AB is called the baseline of the microphone array. Let the active camera be at location O, whose optical axis is perpendicular to AB. The goal of SSL is to estimate the angle ∠COX such that the active camera can point at the right direction. When the distance of the target, i.e., |OC|, is much larger than the length of the baseline |AB|, the angle ∠COX can be estimated as follows:

$$\angle COX \approx \angle BAD = \arcsin\frac{|BD|}{|AB|} = \arcsin\frac{D \times v}{|AB|} \quad (3)$$

where D is the time delay and v=342 m/s is the speed of sound traveling in air.

Several potential sensor-camera setups may be used to track audience members. First, a microphone may be attached to the camera. Just like a human head has two ears the two microphones may be attached to the left and right sides of the active camera. In this configuration, an estimate is made to determine whether the sound source is from left or from right, and there is no need to know the exact direction. This configuration, however, has two major problems in the lecture room context.

One problem is that the camera's width is not wide enough to be a good baseline for the microphone array. As can be seen from Equation (3), the SSL resolution is inversely proportional to the length of the baseline. A small baseline will result in poor resolution. A solution to this problem is to attach an extension structure to the camera and then attach the microphones to that structure to extend the microphone array's baseline. However, this solution leads to the second problem of this configuration, distraction. Local audience members do not want to see moving objects that may distract their attention. That is why in most of lecture rooms the tracking cameras are hidden inside a dark dome. In this configuration, however, since the microphones are attached to the active camera, the whole tracking unit has to be outside the dome in order for the microphones to hear. By extending the baseline of the microphone array, we will increase the distraction factor as well. The distraction factor of such a setup makes it unusable in real lecture rooms.

An alternative solution is to have static microphones and a moving camera. In this configuration the microphone array is detached from the active camera, but the microphone array's baseline is kept perpendicular to the camera's optical axis to ensure easy coordinate system transformation. By separating the microphones from the camera, we have a more flexible configuration. For example, the camera can be hidden inside a dark dome above the microphone array. In addition, because the microphone array is static, we can have a much larger baseline without causing any movement distraction. An example of a preferred baseline is 22.5 cm.

Virtual Director

The responsibility of the virtual director is to gather and analyze reports from different virtual cinematographers, to make intelligent decisions on which camera view to select as the current (or output camera view), and to control the mixer to generate the final video output. Just like human video directors, a good virtual director observes the rules of cinematography and video editing in order to make the lecture video more informative and entertaining. These expert video production rules are discussed in detail below.

IV. Expert Video Production Rules

Current automated video production techniques produce a video by focusing on technology rather than on what an audience prefers to see. Thus, these current techniques lack a systematic study on expert video production rules. Expert video production rules are those rules used by video production professionals to produce high-quality videos. These expert video production rules provide a set of constraints for the video production process. For example, there are rules used by video professionals on how to frame a speaker (such as a lecturer) and how to transition from one camera shot to the next. Following these rules makes it more likely that the video will be of high quality and that a viewer will enjoy the viewing experience. For example, one expert video production rule states that each shot should be longer than a minimum duration. Violating this rule produces a video that quickly jumps from one camera shot to the next and is highly distracting to a viewer. If a video were produced that continuously violated this rule, the video may be so distracting that the viewer simply stop watching the video or may miss valuable information presented therein.

In general, the expert video production rules used by the present invention may be obtained from a variety of sources. By way of example, these rules may be obtained from a textbook, an interview with a video professional, a technical paper, or by observing the work of a video professional. A set of expert video production rules is generated by obtaining information from many sources (such as interviews with several video professionals) and including the most common rules within the set. If certain rules conflict they either can be excluded or the rules having the most weight can be included. By way of example, a rule may be considered to have more weight if the rule was from a video professional who has a great deal of experience or if the rule was obtained from a classic textbook on video production. These expert video production rules may also be implemented in a system whereby the set of expert video production rules may be expanded. This expansion may occur through the use of machine learning techniques (such as neural networks). Thus, the set of expert video production rules may be changed as the automated video production system "learns" new rules.

In a preferred embodiment, the present invention uses expert video production rules obtained from discussions with seven professional video producers. These rules are categorized into three types of rules: (1) camera setup rule, dictating a rule about how the cameras should be set up; (2) lecturer framing rules, dictating how to frame a lecturer;

and, (3) editing (or virtual director) rules, including rules dictating how to edit the video inputs and how to choose an camera output. These expert video production rules may be summarized as follows.

Camera Setup Rule

The camera setup rule governs the set up of the cameras used to capture a lecture. This rule prescribes how cameras should be set up to provide the best possible finished video product. The camera setup rule is based on a "line of interest". In video production, especially in filmmaking, there is a "line of interest". This line of interest can be a line linking two people, a line a person is moving along, or a line a person is facing. The camera setup rule (or the "line of interest" rule) states:

1. Do not cross the line of interest

For example, if an initial shot is taken from the left side of the line, subsequent shots should be taken from that side. This rule will ensure that a moving person maintains the direction of apparent motion. This rule can only be violated when a neutral shot is used to make the transition from one side of the line to the other. Following this camera setup rule when setting up the cameras used to capture a lecture helps to ensure success.

Referring to FIG. 1, the lecturer 110 normally moves behind the podium 115 and in front of the screen 140. In this lecture room environment, when the object of interest is the lecturer 110, the "line of interest" is the line that the lecturer 110 is moving along: a line behind the podium 115 and in front of the screen 140. The camera setup shown in FIG. 1 satisfies the "line of interest" rule of not crossing this line. When the object of interest is the audience, the line of interest is the line linking the lecturer and the audience. The camera setup shown in FIG. 1 satisfies the rule in this case as well.

Lecturer Framing Rules

The lecturer framing rules prescribe how to frame a lecturer. The lecturer is the most important object in a lecture. Thus, correctly framing the lecturer is of great importance. In this preferred embodiment, the rules for framing the lecturer state:

2. Do not move the lecturer-tracking camera too often—only move when the lecturer moves outside a specified zone.

3. Frame the lecturer so that there is half-a-head of room above the lecturer's head.

Virtual Director Rules

The virtual director rules are the rules that prescribe how video inputs should be edited and how a current camera view should be selected from the multiple camera views provided by the camera system. The following rules govern what a virtual director should do with the multiple camera views sent from multiple virtual cinematographers.

1. Establish the shot first. In lecture filming, it is good to start with an overview shot such that remote audiences get a global context of the environment.

2. Do not make jump cuts—when transitioning from one shot to another, the view and number of people should be significantly different. Failing to do so will generate a jerky and sloppy effect.

3. Do not cut to a camera that is too dark. This will ensure better final video quality.

4. Each camera shot should be longer than a minimum duration $D_{min}$ (preferably approximately four seconds). Violating this rule is distracting for the remote audience.

5. Each shot should be shorter than a maximum duration $D_{max}$. Violating this rule makes the video boring to watch. The value of $D_{max}$ is different depending on which camera is used.

6. When all other cameras fail, switch to safe back-up cameras (which in this preferred embodiment is the overview camera).

7. When a person in the audience asks a question, promptly show that person. This is important for remote audience members to follow the lecture.

8. Occasionally, show local audience members for a period of time (e.g., 5 seconds) even if no one asks a question. This will make the final video more interesting to watch.

The first six rules are generic while the last two specifically deal with how to properly select audience shots. For rule 1, the present invention starts with an overview camera shot to establish the lecture context. For rule 2, the camera setup of the present invention as shown in FIG. 1 ensure that there are no "jump cuts" because the views of the cameras are significantly different from each other. For rule 3, the gain control of each camera in a lecture room must be carefully calibrated such that shots meet the brightness requirement. As for rules 4 through 8, the present invention includes an audience camera and the virtual director of the present invention uses these rules to select a current camera view.

V. Operation of the Invention

Figure 6:
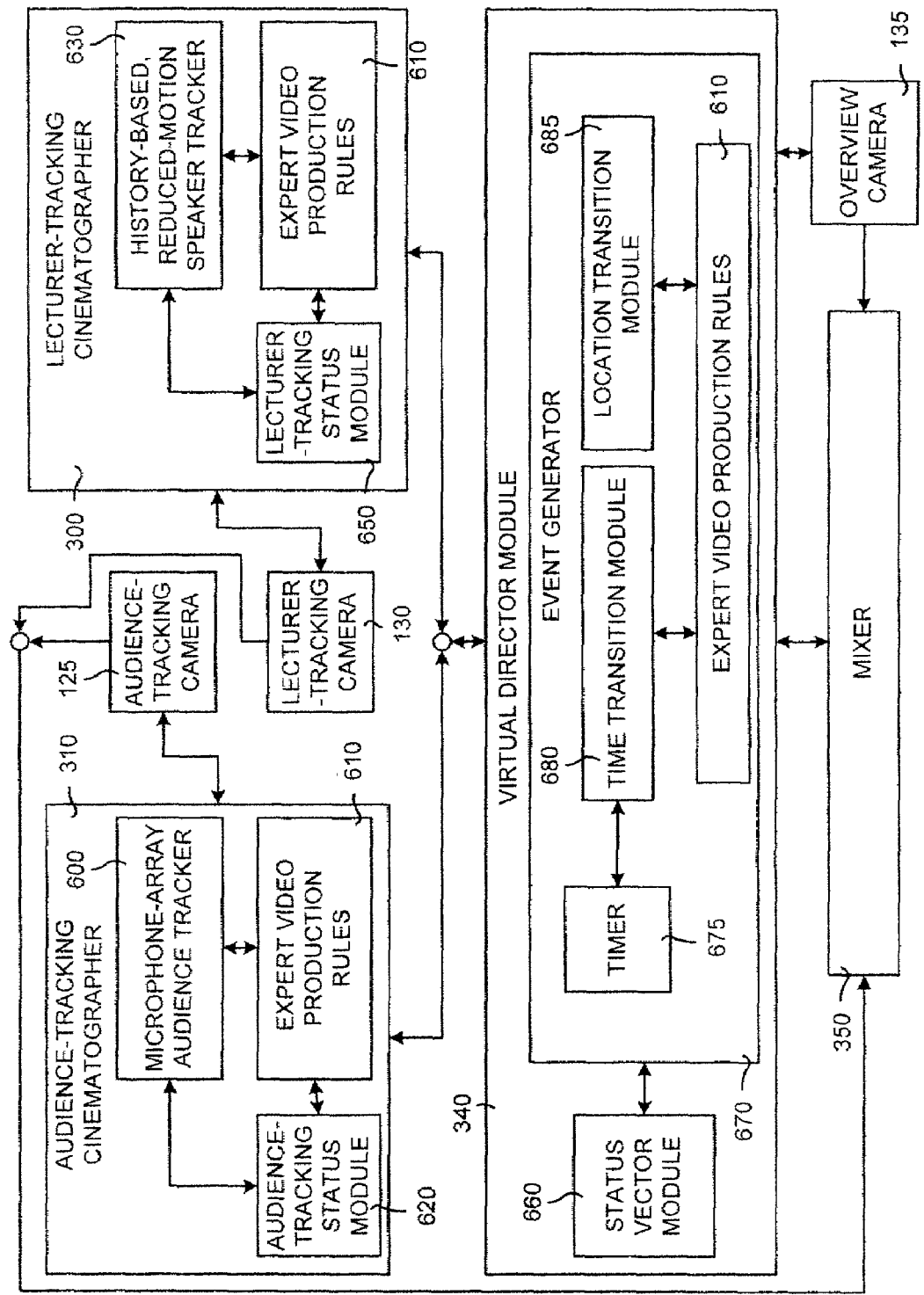
FIG. 6 is a detailed block diagram illustrating the interaction between the audience-tracking cinematographer, the lecturer-tracking cinematographer, the overview camera cinematographer, the virtual director module and the mixer shown in FIG. 4.

FIG. 6 is a detailed block diagram illustrating the interaction between the audience-tracking cinematographer 310, the lecturer-tracking cinematographer 300, the virtual director 340 and the mixer 350 shown in FIG. 4. The audience-tracking cinematographer 310 is in communication with the audience-tracking camera 125 and for providing images of audience members and includes a microphone array audience tracker 600 that controls the audience-tracking camera 125. The audience tracker 600 uses a microphone array (not shown) and expert video production rules 610 (such as those discussed above) to control the audience-tracking camera 125 and frame each camera view. An audience-tracking status module 620 provides status information to the virtual director 340.

Similarly, the lecturer-tracking cinematographer 300 is in communication with the lecturer-tracking camera 130 for providing images of the lecturer and includes a history-based, reduced-motion lecturer tracker 630 that controls the lecturer-tracking camera 130. The expert video production rules 610 are used by the lecturer tracker 630 to control the lecturer-tracking camera 130 and a lecturer-tracking status module 650 reports the status (such as "ready" or "not ready") of the lecturer-tracking camera 130 to the virtual director 340.

The lecturer-tracking cinematographer 300 includes the history-based, reduced motion tracker 630. This tracker 630 operates by zooming in or out on a subject (such as a lecturer or audience member) depending on the history of the subject's movement. For example, if a lecturer has a history of frequently changing locations the tracker 630 takes this into account and set an appropriate camera zoom to capture the lecturer. Once the camera zoom is set the tracker 630 generally does not move the camera (either to the left and right or zoom in and out) but remains fixed. Thus, based on the history of movement of the subject, the tracker 630 sets up a camera view and remains fixed until the subject moves out of camera view. Once this happens, the virtual director 340 generally assigns another camera as the output camera. The history-based, reduced motion lecturer tracker 630 of the present invention ensures that the lecturer-tracking camera 130 camera is not continually zooming in or out or panning left and right and thus reduces distractions to the viewer.

In general, the history-based reduced-motion feature of the present invention does not move once the camera locks and focuses on the lecturer. Camera movement only occurs if the lecturer moves out of the frame or if the virtual director switches to a different camera. In particular, let $(x_t, y_t)$ be the location of the lecturer estimated from the wide-angle camera. According to the history-based reduced-motion feature of the present invention, before the virtual director cuts to the lecturer-tracking camera at time t, the lecturer-tracking virtual cinematographer will pan/tilt the camera such that it locks and focuses on location $(x_t, y_t)$. To determine the zoom level of the camera, lecturer-tracking virtual cinematographer maintains the trajectory of lecturer location in the past T seconds, $(X, Y) = \{(x_1, y_1), \ldots, (x_t, y_t), \ldots, (x_T, y_T)\}$. Currently, T is set to 10 seconds. The bounding box of the activity area in the past T seconds is then given by a rectangle $(X_L, Y_T, X_R, Y_B)$, where they are the left-most, top-most, right-most, and bottom-most points in the set $(X, Y)$. If it is assumed that the lecturer's movement is piecewise stationary, then $(X_L, Y_T, X_R, Y_B)$ is a good estimate of where the lecturer will be in the next T' seconds. The zoom level $Z_L$ is calculated as follows:

$$Z_L = \min\left(\frac{HFOV}{L(X_R, X_L)}, \frac{VFOV}{L(Y_B, Y_T)}\right) \quad (4)$$

where HFOV and VFOV are the horizontal and vertical field of views of the active camera, and $\angle(\bullet, \bullet)$ represents the angle spanned by the two arguments in the active camera's coordinate system. The history-based reduced-motion feature of the present invention allows the lecturer-tracking virtual cinematographer to control the active camera in such to reduce camera movement while also maintaining the tightest camera views possible.

The microphone array audience tracker 600 uses a microphone array-based technique to track audience members who are talking. In one embodiment, the type of microphone array-based approach used is the sound source localization (SSL) technique described in detail above. The SSL approach uses correlation techniques to find the time difference between an audio signal arriving at two microphones. From the time difference and microphone array's geometry, the sound source location can be estimated.

Communication Between Virtual Cinematographers and the Virtual Director

Each of the cameras reports a status to the virtual director 340. Each virtual cinematographer periodically reports its status $S_T$, camera zoom level $Z_L$, and tracking confidence level $C_L$ to the virtual director. The virtual director collects all the $S_T$, $Z_L$, and $C_L$ from the virtual cinematographers. Based on the collected information and history data, the virtual director then decides which camera is chosen as the final video output and switches the mixer to that camera. The virtual director also sends its decision $D_S$ back to the virtual cinematographers to coordinate further cooperation.

When the lecturer-tracking cinematographer reports to the virtual director, $S_T$ takes on values of {READY, NOTREADY}. $S_T$ is READY when the camera locks and focuses on the target. $S_T$ is NOTREADY when the camera is still in motion or the target is out of the view of the camera. $Z_L$ is computed by using Equation (4) and normalized to the range of [0, 1]. $C_L$ is 1 if the target is inside the active camera's FOV and is 0 otherwise. It should be noted that the statuses {READY, NOTREADY} are just examples. There can be much more complex statuses, such as trying to focus, performing panning, done static, and so forth.

Communication between the audience-tracking virtual cinematographer and the virtual director occurs as follows. Once the microphone array detects a sound source and estimates the sound source direction with enough confidence, the audience-tracking virtual cinematographer will pan the active camera to that direction. Status $S_T$ is READY when the active camera locks on the target and stops moving. $S_T$ is NOTREADY when the active camera is still panning toward the sound source direction.

To obtain a good estimate of the confidence level $C_L$, a natural quantity associated with GCC is used. Namely, the correlation coefficient, $\rho$, represents how correlated two signals are, and thus represents how confident the TDOA estimate is. Its value always lies in the range of [−1,+1]. $C_L$ can then be computed as follows:

$$C_L = (\rho + 1)/2$$

$$\rho = \frac{\hat{R}_{x_1 x_2}(\tau)}{\sqrt{\hat{R}_{x_1 x_1}(0)\hat{R}_{x_2 x_2}(0)}}$$

where $\hat{R}_{ij}(\tau)$ is defined in Equation (2).

In addition to promptly showing the talking audience members, an important framing rule for the audience-tracking virtual cinematographer is to have the ability to show a general shot of the audience members even though none of them are talking. This added ability makes the recorded lecture more interesting and useful to watch. These types of camera views are normally composed of a slow pan from one side of the lecture room to the other. To support this framing rule, the audience-tracking virtual cinematographer's status $S_T$ takes an extra value of {GENERAL} in addition to {READY, NOTREADY}, and the virtual director's decision $D_S$ takes an extra value of {PAN} in addition to {LIVE, IDLE}. Status $S_T$ equals {GENERAL} when the camera is not moving and the microphone array does not detect any sound source either. After the virtual director receives status $S_T$={GENERAL} from the audience-tracking virtual cinematographer, it will decide if it wants to cut to the audience-tracking virtual cinematographer's camera. If so, the virtual director will send decision $D_S$={PAN} to the audience-tracking virtual cinematographer. Upon receiving this decision, the audience-tracking virtual cinematographer will slowly pan its camera from one side of lecture room to the other.

Referring again to FIG. 6, the audience-tracking cinematographer 310 and the lecturer-tracking cinematographer 300 send data to the mixer 350 and to the virtual director 340. The mixer 350 receives video data from the cinematographers 300, 310 and the overview camera 135. The virtual director 340 receives status and control data from the two cinematographers 300, 310 and the overview camera 135. Based on this status and control data, the virtual director 340 determines which of the cameras is the camera output. One purpose of the virtual director 340 is to gather and analyze reports from the cinematographers 300, 310 and to control the mixer 350 to generate the final video based on expert video production editing rules. The virtual director 340 uses two important components to achieve this goal: a status vector module 660 to maintain the status of each cinematographer 300, 310 and an event generator 670. The event generator 670 includes a module that generates a triggering event that triggers a switching from one camera view to another and a finite state machine (FSM) to decide to which camera view to switch.

The event generator 670 includes an internal timer 675 to keep track of how long a particular camera has been on, and a report vector $R=\{S_T, Z_L, C_L\}$ to maintain each virtual cinematographer's status $S_T$, zoom level $Z_L$ and confidence level $C_L$. The event generator 670 is capable of generating two types of triggering events that cause the virtual director module 340 to switch cameras. One type of event is called a "status change" event. A status change event occurs when a status of a cinematographer changes. The second type of event is called a "time expire" event. The time expire event occurs if a camera has been on for longer than a predetermined amount of time, as determined by the timer 675. Both the status change triggering event and the time expire triggering event are discussed in detail below.

The status vector module 660 processes status information received from the cinematographers 300, 310. The status vector module 660 maintains the status element, $S_T$, of the report vector $R=\{S_T, Z_L, C_L\}$. The status element keeps track of the status of each cinematographer. By way of example, if there are three cameras in the system the report vector has three elements. These three elements represent the current information from the lecturer-tracking cinematographer 300, the audience-tracking cinematographer 310 and the overview camera 135. In this example, the status element of the lecturer-tracking cinematographer 300, $S_T$ [1], takes two values, {READY, NOTREADY}. The status element of the audience-tracking cinematographer 310, $S_T$ [2], takes three values, {READY, NOTREADY, GENERAL}. Because the overview camera is a safe back-up camera, its status element, $S_T$ [3], takes only one value, {READY}. Together, these status elements represent a combination of 2×3×1=6 overall statuses for the entire system. It should be noted that this example is merely illustrative and more or less values may be used for the status element.

The event generator 670 constantly monitors the report vector $R=\{S_T, Z_L, C_L\}$. If any cinematographer reports a status change, then a status change event is generated. The virtual director module 340 then takes action in response to this status change event. For example, on response by the virtual director module in response to a status change event is to switch to a different camera.

The event generator 670 determines which of the multiple camera view provided by the camera system should be the current camera view. The event generator 670 includes a time transition module 680, a location transition module 685 and the expert video production rules 610. In general, the event generator 670 determines transitions from one camera view to another camera view based on a triggering event. The time transition module 680 determines when a transition should occur and generates a time expire triggering event. The location transition module 685 determines to which camera the transition should proceed. Both the time transition module 680 and the location transition module 685 follow the expert video production rules 610 when determining when and where to transition.

The time transition module 680 generates a time expire event as follows. In video production, switching from one camera to another is called a cut. The period between two cuts is called a video shot. An important video editing rule is that a shot should not be too long or too short. To ensure this rule, each camera has its minimum shot duration $D_{MIN}$ and its maximum allowable duration $D_{MAX}$. If a shot length is less than $D_{MIN}$, the no switching between cameras will occur. On the other hand, if a camera has been on longer than its $D_{MAX}$, a time expire event will be generated. By way of example, $D_{MIN}$ may be set to approximately 5 seconds for all cameras based on the suggestions of professional video producers.

Two factors affect the length of a shot, $D_{MAX}$. One factor is the nature of the shot and the other factor is the quality of the shot. The nature of shot determines a base duration $D_{BASE}$ for each camera. Lecturer-tracking shots generally are longer than overview shots, because they generally are more interesting. By way of example, exemplary values for $D_{BASE}$ are 60 seconds for the lecturer-tracking camera when $S_T$=READY, 10 seconds for the audience-tracking camera when $S_T$=READY, 5 seconds for the audience-tracking camera when $S_T$=GENERAL, and 40 seconds for the overview camera when $S_T$=READY.

The quality of a shot is defined as a weighted combination of the camera zoom level $Z_L$ and the tracking confidence level $C_L$. Quality of the shot affects the value of $D_{MAX}$ such that high-quality shots should last longer than low-quality shots. Thus, the final $D_{MAX}$ is a product of the base length $D_{BASE}$ and the shot quality:

$$D_{MAX}=D_{BMAX}\times(\alpha Z_L+(1-\alpha)C_L)$$

where α is chosen experimentally. By way of example, an exemplary value α for is α=0.4.

Upon receiving a triggering event, the virtual director uses the location transition module 685, which in this case is a multiple state probabilistic finite state machine (FSM), to determine to which camera to switch. In this preferred embodiment, the multiple-state probabilistic finite state machine 685 determines at any given moment which camera to switch to upon receipt of a triggering event.

Figure 7:
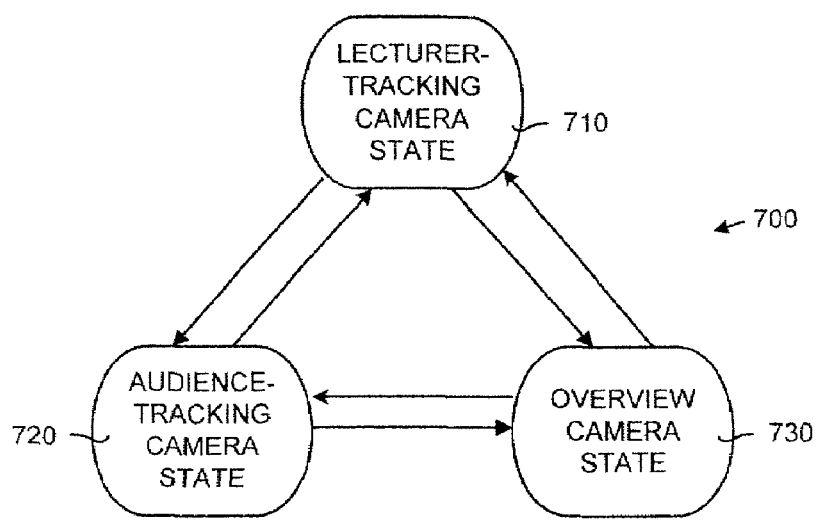
FIG. 7 illustrates a preferred embodiment of the probabilistic location transition module shown in FIG. 6.

By way of example, FIG. 7 illustrates a three-state probabilistic finite state machine 700. In this embodiment, the three-state probabilistic finite state machine 700 includes a lecturer-tracking camera state 710, an audience-tracking camera state 720, and an overview camera state 730, each represented by a state. The three states are fully connected to allow any transition from one state to another. When to transition is governed by the triggering events described above. Where to transit is determined by the transition probabilities of the finite state machine (FSM).

The transition probabilities of the FSM use the expert video production rules 610. As an example, one expert video production rule states that a cut should be made more often from the lecturer-tracking camera to the overview camera than to the audience-tracking camera. This rule is used by the FSM by making the transition probability of the lecturer-tracking camera higher than that of the audience-tracking camera. At a microscopic level, each camera transition is random, resulting in interesting video editing effects. At a macroscopic level, some transitions are more likely to happen than others, obeying the expert video production rules.

VI. Working Example and User Study Results

The following discussion presents a working example of an implementation of the automated video production system and method discussed above. This working example is provided for illustrative purposes and is one of several ways in which the present invention may be implemented. In addition, results from user study are presented. This user study had two objectives. First, the study sought to evaluate how much each individual expert video production rule affected a remote audience's viewing experience. Second, the study sought to compare the overall video quality of the automated camera management module to that of a human camera operator. The human operator that was uses in this study was a professional camera operator with many years of experience in photo and video editing.

The automated video production of the present invention was deployed in a lecture room, similar to the lecture room shown in FIG. 1. In this working example, there were three cameras and the projection device in the lecture room. This lecture room is used on a regular basis to record lecture and broadcast them live to employees at their desktops as well as being archived for on-demand viewing. The human camera operator used in this study is experienced in using the three cameras and projection device in this lecture room to capture lectures.

In order to make a fair comparison between the present invention and the human camera operator, the lecture room was restructured so that both the human operator and the present invention used three cameras and the projection device. Both the human operator and the present invention use the same static overview camera and projection device camera, while having separate lecturer-tracking cameras and separate audience-tracking cameras that are placed at close-by locations. The present invention and human operator also used independent mixers.

Two studies were conducted: a first study was a field study using a major organization's employees while the second study was a lab study with participants recruited from local colleges. For the field study, four lectures were used, including three regular technical lectures and a fourth general-topic lecture on skydiving held specifically for this study. The skydiving lecture was also used for the lab study. In the first study, a total of 24 employees watched one of the four lectures live from their desktops in the same way they would watch any other lecture. While providing a realistic test of the present invention, this study lacked a controlled environment and the remote audience members may have watched the lecture while doing other tasks like reading e-mail or surfing the web. The second study was a more controlled study and was a lab study that used eight college students from local colleges. College students were recruited because of their experience in watching lectures in their day-to-day life.

Figure 8:
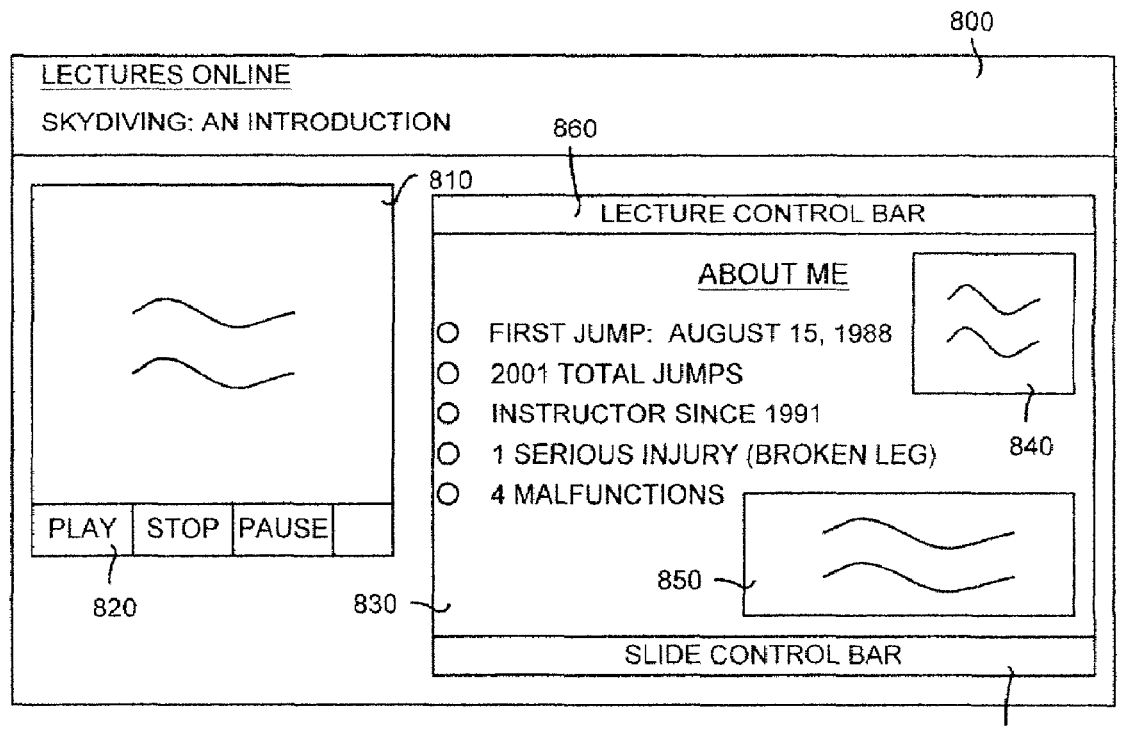
FIG. 8 illustrates a preferred embodiment of the remote audience graphical user interface shown in FIG. 4.

In both studies, the remote audience graphical user interface 800 shown in FIG. 8 was used. The left portion of the interface 800 includes a MediaPlayer window 810, which is manufactured by Microsoft Corporation located in Redmond, Wash. The window 810 displays the video edited by the virtual director 340 of the present invention. In other words, the outputs of the lecturer-tracking camera 130, the audience-tracking camera 125 and the overview camera 135 are first edited by the virtual director 340 and then displayed in the window 810. Under the window 810 are controls 820 for controlling the video within the window including "play", "stop" and "pause" buttons.

The right portion of the interface 800 includes a slide window 830 that displays lecture slides that are synchronized with the video. The output of the visual presentation tracking camera 145 is displayed directly in the slide window 830. In an alternate embodiment, the slide window 830 is eliminated and the output from the visual presentation tracking camera 145 is integrated into the window 810. In the example shown in FIG. 8, the slide includes a first picture 840 and a second picture 850 along with text. A lecture control bar 860 contains controls (such as controls that allow a lecturer biography to be presented) for controlling information regarding the lecture and a slide control bar 870 contains controls (such as previous slide or next slide) that allow user control of the slides presented in the slide window 830.

All four lectures for the study were captured simultaneously by the human camera operator and the automated camera management module of the present invention. When study participants watched a lecture, the version captured by the human operator and the version capture by the automated camera management module captured version alternated in the MediaPlayer window of the remote audience graphical user interface. For the three 1.5-hour regular lectures, the two versions alternated every 15 minutes. For the half-hour skydiving lecture, the two versions alternated every 5 minutes. The version presented first was randomized. After watching each lecture, study participants provided feedback using a survey.

The survey was intended to test how well the present invention performed compared to the human camera operator. Performance was measured using questions based on each of the expert video production rules as well as two Turing test questions that evaluate whether study participants could correctly determine which video was produced by a person as opposed to the automated video production system and method of the present invention.

Results from the survey shows that there is a general trend whereby a human operator is rated slightly higher than the automated system of the present invention. To push the comparison to an extreme, at the end of the survey we asked a simple Turing test: "do you think each camera operator is a human or computer?" The results clearly showed that study participants could not determine which system is the computer and which system is the human at any rate better than chance. For these particular lectures and study participants, the present invention passed the Turing test.

The data clearly show that study participants could not determine which system was the automated video production system and method and which was the human camera operator at any rate better than chance. There are at least two implications from this study. First, the present invention appears not to be making any obvious mistakes repeatedly that the study participants can notice. Second, many study participants probably realize that even human camera operators make mistakes. For example, a human camera operator may sometimes be tired, distracted, or plain bored by the lecturer and lecture content.

The foregoing description of preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. An automated video production system for online publishing of a lecture, comprising:
   a camera system that provides multiple camera views of the lecture in a real-world lecture environment, wherein the camera system includes a lecturer-tracking camera that provides a camera view of a lecturer;
   a history-based, reduced-motion tracker that controls the lecturer-tracking camera in tracking the lecturer based on a history of the lecturer's movement;
   a set of expert video production rules that are probabilistic rules used by human video professionals in a video production field, the expert video production rules being weighted such that a first rule of the expert video production rules has greater weight as compared to a second rule of the expert video production rules, so that if the first rule and the second rule conflict the first rule is used and the second rule is discarded since the first rule has a greater weight than the second rule; and a virtual director that uses the set of expert video production rules to select a current camera view from the multiple camera views and is capable of changing the current camera view by switching between the multiple camera views in response to a triggering event.

2. The automated video production system as set forth in claim 1, wherein the set of expert video production rules is applied by the virtual director to determine to which of the multiple camera views to switch.

3. The automated video production system as set forth in claim 1, wherein the set of expert video production rules are applied by the virtual director to generate the triggering event and determine when to switch the current camera view.

4. The automated video production system as set forth in claim 1, wherein the camera system includes a single camera.

5. The automated video production system as set forth in claim 1, wherein the camera system includes a plurality of cameras.

6. The automated video production system as set forth in claim 1, further comprising a virtual cinematographer that controls a camera in tracking an object within the lecture.

7. The automated video production system as set forth in claim 1, wherein the camera system includes an audience-tracking camera that provides a camera view of an audience.

8. The automated video production system as set forth in claim 7, further comprising a microphone-array audience tracker that controls the audience-tracking camera in tracking a member of the audience.

9. The automated video production system as set forth in claim 7, further comprising an audience-tracking status module that provides status information of the audience-tracking camera to the virtual director.

10. The automated video production system as set forth in claim 9, wherein the status information includes a plurality of possible statuses.

11. The automated video production system as set forth in claim 1, further comprising a lecturer-tracking status module that provides status information of the lecturer-tracking camera to the virtual director.

12. The automated video production system as set forth in claim 1, wherein the virtual director includes an event generator that generates the triggering event.

13. The automated video production system as set forth in claim 12, wherein the event generator further comprises a time transition module that determines when to switch the current camera view.

14. The automated video production system as set forth in claim 12, wherein the event generator further comprises a location transition module that determines to which of the multiple camera views to switch.

15. The automated video production system as set forth in claim 14, wherein the location transition module is a probabilistic finite state machine having multiple states.

16. A method for automatically producing a video of a lecture for online publishing, comprising:

providing a set of expert video production rules that are probabilistic rules used by human video professionals in a video production field;

weighting the expert video production rules such that a first rule of the expert video production rules has greater weight as compared to a second rule of the expert video production rules, so that if the first rule and the second rule conflict the first rule is used and the second rule is discarded since the first rule has a greater weight than the second rule;

capturing the lecture in a real-world lecture environment using a camera system that includes multiple camera views, wherein the camera system includes a lecturer-tracking camera; tracking the lecturer based on a history of the lecturer's movement using a history-based, reduced-motion tracker; and receiving as input audio and video tracking results and using the set of expert video production rules and a finite state machine to automatically determine a current camera view from the multiple camera views, when the current camera view should change, and to which of the multiple camera views the current camera view should change based on a probabilistic approach that uses a probabilistic transition matrix constricted by the expert video production rules such that a next current camera view is a weighted random choice.

17. A computer-readable medium having stored therein computer-executable instructions that, when executed by the computer, perform the method recited in claim 16.

18. The method as set forth in claim 16, wherein the set of expert video production rules are a set of constraints for producing the video.

19. The method as set forth in claim 16, wherein the set of expert video production rules is obtained by determining rules used by human experts in a video production field.

20. The method as set forth in claim 16, wherein the current camera view is changed in response to a triggering event.

21. The method as set forth in claim 20, wherein the triggering event is generated based on the set of expert video production rules.

22. The method as set forth in claim 16, wherein the probabilistic approach uses the probabilistic finite state machine having multiple states that are fully connected to allow transition from one state to another.

23. The method as set forth in claim 16, wherein the camera system includes an audience-tracking camera that provides a camera view of an audience of the lecture.

24. The method as set forth in claim 23, further comprising using the set of expert video production rules to control the audience-tracking camera in tracking members of the audience.

25. The method as set forth in claim 16, wherein the lecturer-tracking camera tracks the lecturer using the set of expert video production rules.

26. An automated video production system for capturing images of a real-world scene, comprising:

an audience-tracking camera that provides images of an audience within the real-world scene;

a lecturer-tracking camera that non-intrusively tracks a lecturer within the real-world scene;

a history-based, reduced-motion tracker that controls the lecturer-tracking camera in tracking the lecturer based on a history of the lecturer's movement;

a set of expert video production rules containing video production constraints; and a virtual director module using a probabilistic finite state machine and receiving as input audio and video tracking results from the audience-tracking camera and the lecturer-tracking camera and using the set of expert video production rules and probabilistic rules to automatically select a current camera view from the multiple camera views in a real-world environment such that the current camera view is a weighted random choice.

27. The automated video production system as set forth in claim 26, further comprising an overview camera that provides an overview image of the scene.

28. The automated video production system as set forth in claim 26, wherein the current camera view is capable of changing to one of the multiple camera views in response to a triggering event.

29. The automated video production system as set forth in claim 28, wherein the set of expert video production rules is used to determine when the triggering event is generated.

* * * * *